United States Patent
Zhao et al.

(10) Patent No.: US 11,937,216 B2
(45) Date of Patent: *Mar. 19, 2024

(54) METHOD AND APPARATUS FOR DETERMINING DATA FEEDBACK RESOURCE

(71) Applicant: Huawei Technologies Co., Ltd., Shenzhen (CN)

(72) Inventors: Zhenshan Zhao, Shenzhen (CN); Deping Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/715,620

(22) Filed: Apr. 7, 2022

(65) Prior Publication Data

US 2022/0295453 A1    Sep. 15, 2022

Related U.S. Application Data

(63) Continuation of application No. 16/574,733, filed on Sep. 18, 2019, now Pat. No. 11,330,561, which is a (Continued)

(30) Foreign Application Priority Data

Mar. 20, 2017    (CN) .......................... 201710166177.2

(51) Int. Cl.
*H04L 5/00*       (2006.01)
*H04W 4/40*       (2018.01)
(Continued)

(52) U.S. Cl.
CPC ............. *H04W 72/02* (2013.01); *H04W 4/40* (2018.02); *H04W 72/51* (2023.01); *H04W 76/11* (2018.02); *H04W 92/18* (2013.01)

(58) Field of Classification Search
CPC ....... H04W 72/02; H04W 4/40; H04W 72/51; H04W 76/11; H04W 92/18; H04L 5/0094; H04L 5/0055
See application file for complete search history.

(56) References Cited

U.S. PATENT DOCUMENTS 10,291,364 B2    5/2019  Wakabayashi et al.
11,330,561 B2 *  5/2022  Zhao .................... H04W 76/11
(Continued)

FOREIGN PATENT DOCUMENTS

CN    102396176 A    3/2012
CN    103379661 A    10/2013
(Continued)

OTHER PUBLICATIONS

Xiaomei et al., "Mobile Communication Technology", 2015 edition, 6 pages, Xidian University Press.

*Primary Examiner* — Joseph E Dean, Jr.
(74) *Attorney, Agent, or Firm* — Slater Matsil, LLP

(57) ABSTRACT

This application discloses a method and an apparatus for determining a data feedback resource. The method includes receiving, by a first terminal, first data sent by a second terminal. The method includes determining a feedback resource of the first data. The feedback resource of the first data is a feedback resource in a feedback resource pool. The method includes sending feedback information of the first data to the second terminal on the feedback resource. The feedback information indicates a receiving status of the first data.

26 Claims, 6 Drawing Sheets

Related U.S. Application Data continuation of application No. PCT/CN2018/079505, filed on Mar. 19, 2018.

(51) Int. Cl.
*H04W 72/02* (2009.01)
*H04W 72/51* (2023.01)
*H04W 76/11* (2018.01)
*H04W 92/18* (2009.01)

(56) References Cited

U.S. PATENT DOCUMENTS

| | | |
|---|---|---|
| 2013/0176950 A1 | 7/2013 | Hakola et al. |
| 2014/0056156 A1 | 2/2014 | Jöngren |
| 2014/0177540 A1 | 6/2014 | Novak et al. |
| 2016/0249355 A1 | 8/2016 | Chae et al. |
| 2017/0055248 A1 | 2/2017 | Moon et al. |
| 2017/0347394 A1 | 11/2017 | Yasukawa et al. |

FOREIGN PATENT DOCUMENTS

| | | | |
|---|---|---|---|
| CN | 104080170 | A | 10/2014 |
| CN | 105553612 | A | 5/2016 |
| CN | 104798388 | | 4/2019 |
| EP | 3242515 | A1 | 11/2017 |
| WO | 2016076301 | A1 | 5/2016 |
| WO | 2016078905 | A1 | 5/2016 |
| WO | 2016107244 | A1 | 7/2016 |
| WO | 2017024563 | A1 | 2/2017 |
| WO | 2017052823 | A1 | 3/2017 |

* cited by examiner

METHOD AND APPARATUS FOR DETERMINING DATA FEEDBACK RESOURCE

CROSS-REFERENCE TO RELATED APPLICATIONS

This application is a continuation of U.S. patent application Ser. No. 16/574,733, filed on Sep. 18, 2019, which is a continuation of International Application No. PCT/CN2018/079505, filed on Mar. 19, 2018, which claims priority to Chinese Patent Application No. 201710166177.2, filed on Mar. 20, 2017. All of the afore-mentioned patent applications are hereby incorporated by reference in their entireties.

TECHNICAL FIELD

This application relates to the field of wireless communications technologies, and in particular, to a method and an apparatus for determining a data feedback resource.

BACKGROUND

An internet-of-vehicles system is designed to improve road safety, improve traffic efficiency, and provide a rich streaming service for users through communication between a vehicle and another device (V2X). The other device includes a vehicle, a handheld terminal, a roadside unit (RSU), a network, and the like. The communication between a vehicle and another device includes vehicle-to-vehicle (V2V) communication, vehicle-to-pedestrian (V2P) communication, vehicle-to-network (V2N) communication, and the like, and the V2V communication, the V2P communication, and the V2N communication are collectively referred to as the V2X.

Currently, technologies such as 2G/3G/4G are used for cellular communication. A long term evolution (LTE) technology used in a 4G system has advantages of a high rate, a low latency, large coverage, support for a high-speed moving terminal, and the like. Therefore, during information communication between a vehicle and the outside in a cellular network, a central scheduler such as a base station (Evolved Node B (eNB)) may be fully used to dynamically schedule a transmission resource, to reduce a probability of a communication conflict, and resolve an uncontrollable delay problem. An LTE-V2X technology is a technology of information exchange between a vehicle and another device based on an LTE cellular network, and is an extension to an existing cellular network technology.

In an LTE-V2X system, there are usually two manners of communication between a vehicle and another device. In a first manner, as shown in FIG. 1A, a vehicle sends state information of the vehicle to another nearby vehicle or node in a broadcast manner, and a base station does not need to forward data. In a second manner, as shown in FIG. 1B, a vehicle first sends state information of the vehicle to a base station, and then the base station sends the received data to another vehicle or node in a unicast or broadcast manner.

However, in field of existing internet-of-vehicles technologies, a vehicle serving as a transmit end can only determine whether sending of data that needs to be sent is completed. Because a data feedback resource is not defined, the vehicle serving as the transmit end cannot determine whether the sent data is successfully received, and consequently data transmission reliability is low.

SUMMARY

This application provides a method and an apparatus for determining a data feedback resource, to resolve a problem of relatively poor data transmission reliability in an existing internet-of-vehicles technology.

According to a first aspect, a method for determining a data feedback resource is provided. The method includes receiving, by a first terminal, first data sent by a second terminal. The method further includes determining, by the first terminal, a feedback resource of the first data. The feedback resource of the first data is a feedback resource in a feedback resource pool. The method further includes sending, by the first terminal, feedback information of the first data to the second terminal on the feedback resource. The feedback information indicates a receiving status of the first data.

A beneficial effect is as follows: After receiving the first data sent by the second terminal, the first terminal can send the feedback information of the first data to the second terminal on the feedback resource of the first data that is determined in the feedback resource pool. Therefore, the second terminal serving as a transmit end can determine, by detecting the feedback information, whether the sent first data is successfully received, thereby improving data transmission reliability.

With reference to the first aspect, in a possible design, determining, by the first terminal, a feedback resource of the first data includes determining, by the first terminal, time-frequency information and/or code domain information of the feedback resource of the first data. The time-frequency information includes start location information of a frequency domain resource, a length of the frequency domain resource, and indication information of a time domain resource. The code domain information includes a codeword used to send the feedback information.

With reference to the first aspect, in a possible design, determining, by the first terminal, a feedback resource of the first data includes obtaining, by the first terminal, configuration information of the feedback resource pool and determining, by the first terminal, the feedback resource of the first data based on the configuration information of the feedback resource pool.

In this design, it is simple for the first terminal to determine the feedback resource of the first data based on the configuration information of the feedback resource pool. The feedback resource of the first data is determined in advance, so that a feedback resource conflict can be prevented.

With reference to the first aspect, in a possible design, obtaining, by the first terminal, configuration information of the feedback resource pool includes obtaining, by the first terminal, the configuration information of the feedback resource pool from a network side or obtaining, by the first terminal, the configuration information of the feedback resource pool using preconfigured information.

In this design, the configuration information of the feedback resource pool may be obtained from the network side, or may be locally configured on the first terminal in advance, so that implementations are flexible and diverse.

With reference to the first aspect, in a possible design, obtaining, by the first terminal, configuration information of the feedback resource pool includes obtaining, by the first terminal, at least one of start location information of a frequency domain resource, length information of the frequency domain resource, time-domain subframe offset information, and subframe bitmap information of the feedback resource pool.

With reference to the first aspect, in a possible design, a quantity of frequency domain resources in the feedback resource pool is determined based on a quantity of subchannels in a data resource pool in which the first data is located.

With reference to the first aspect, in a possible design, determining, by the first terminal, a feedback resource of the first data includes obtaining, by the first terminal, time-frequency resource information of the first data and determining, by the first terminal, the time-frequency information of the feedback resource of the first data based on the time-frequency resource information of the first data.

In this design, the time-frequency information of the feedback resource of the first data is associated with time-frequency information of the first data, so that the first terminal can rapidly determine the time-frequency information of the feedback resource of the first data based on the time-frequency information of the first data, thereby improving data transmission reliability.

With reference to the first aspect, in a possible design, the time-frequency resource information of the first data that is obtained by the first terminal includes information about a time-frequency resource carrying sidelink control information (SCI) of the first data and/or information about a time-frequency resource carrying service data of the first data.

With reference to the first aspect, in a possible design, determining, by the first terminal, a feedback resource of the first data includes determining, by the first terminal, code domain information of the feedback resource of the first data Determining, by the first terminal, the code domain information of the feedback resource of the first data includes obtaining, by the first terminal, at least one of time-frequency resource information of the first data, ID information of the first terminal, and ID information of the second terminal, and includes determining, by the first terminal, the code domain information of the feedback resource of the first data based on the at least one obtained information.

In this design, when the feedback resource determined by the first terminal conflicts with a feedback resource of another terminal, a same feedback channel may be multiplexed in a code division manner to resolve the resource conflict.

With reference to the first aspect, in a possible design, sending, by the first terminal, feedback information of the first data to the second terminal on the feedback resource includes obtaining, by the first terminal, time domain information used by a third terminal to send second data and sending, by the first terminal if the first terminal determines that time domain information of the feedback resource of the first data is the same as the time domain information of the second data sent by the third terminal, the feedback information of the first data after a delay of k subframes, where k is an integer greater than 0.

In this design, when the time domain information of the feedback resource used by the first terminal to send the feedback information of the first data is the same as the time domain information used by the third terminal to send the second data, a feedback resource conflict can be prevented in the foregoing manner, thereby improving data feedback efficiency and improving data transmission reliability.

According to a second aspect, a method for determining a data feedback resource is provided. The method includes sending, by a second terminal, first data to a first terminal. The method further includes determining, by the second terminal, a feedback resource of the first data. The feedback resource of the first data is a feedback resource in a feedback resource pool. The method further includes receiving, by the second terminal on the feedback resource, feedback information that is of the first data and that is sent by the first terminal. The feedback information indicates a receiving status of the first data.

A beneficial effect is as follows: After sending the first data to the first terminal, the second terminal can receive, on the feedback resource of the first data that is determined in the feedback resource pool, the feedback information that is of the first data and that is sent by the first terminal. Therefore, the second terminal serving as a transmit end can determine, by detecting the feedback information, whether the sent first data is successfully received, thereby improving data transmission reliability.

With reference to the second aspect, in a possible design, determining, by the first terminal, a feedback resource of the first data includes determining, by the first terminal, time-frequency information and/or code domain information of the feedback resource of the first data. The time-frequency information includes start location information of a frequency domain resource, a length of the frequency domain resource, and indication information of a time domain resource. The code domain information includes a codeword used to send the feedback information.

With reference to the second aspect, in a possible design, determining, by the second terminal, a feedback resource of the first data includes obtaining, by the second terminal, configuration information of the feedback resource pool and determining, by the second terminal, the feedback resource of the first data based on the configuration information of the feedback resource pool.

In this design, it is simple for the first terminal to determine the feedback resource of the first data based on the configuration information of the feedback resource pool. The feedback resource of the first data is determined in advance, so that a feedback resource conflict can be prevented.

With reference to the second aspect, in a possible design, obtaining, by the second terminal, configuration information of the feedback resource pool includes obtaining, by the second terminal, the configuration information of the feedback resource pool from a network side or obtaining, by the second terminal, the configuration information of the feedback resource pool using preconfigured information.

In this design, the configuration information of the feedback resource pool may be obtained from the network side, or may be locally configured on the second terminal in advance, so that implementations are flexible and diverse.

With reference to the second aspect, in a possible design, obtaining, by the second terminal, configuration information of the feedback resource pool includes obtaining, by the second terminal, at least one of start location information of a frequency domain resource, length information of the frequency domain resource, time-domain subframe offset information, and subframe bitmap information of the feedback resource pool.

With reference to the second aspect, in a possible design, a quantity of frequency domain resources in the feedback resource pool is determined based on a quantity of subchannels in a data resource pool in which the first data is located.

With reference to the second aspect, in a possible design, determining, by the second terminal, a feedback resource of the first data includes obtaining, by the second terminal, time-frequency resource information of the first data and determining, by the second terminal, the time-frequency information of the feedback resource of the first data based on the time-frequency resource information of the first data.

In this design, the time-frequency information of the feedback resource of the first data is associated with time-frequency information of the first data, so that the second terminal can rapidly determine the time-frequency information of the feedback resource of the first data based on the time-frequency information of the first data, thereby improving data transmission reliability.

With reference to the second aspect, in a possible design, the time-frequency resource information that is of the first data and that is obtained by the second terminal includes information about a time-frequency resource carrying SCI of the first data and/or information about a time-frequency resource carrying service data of the first data.

With reference to the second aspect, in a possible design, determining, by the second terminal, a feedback resource of the first data includes determining, by the second terminal, code domain information of the feedback resource of the first data. Determining, by the second terminal, the code domain information of the feedback resource of the first data includes obtaining, by the second terminal, at least one of time-frequency resource information of the first data, ID information of the first terminal, and ID information of the second terminal, and includes determining, by the second terminal, the code domain information of the feedback resource of the first data based on the at least one obtained information.

In this design, when the feedback resource determined by the second terminal conflicts with a feedback resource of another terminal, a same feedback channel may be multiplexed in a code division manner to resolve the resource conflict.

With reference to the second aspect, in a possible design, receiving, by the second terminal on the feedback resource, feedback information that is of the first data and that is sent by the first terminal includes obtaining, by the second terminal, time domain information used by a third terminal to send second data and receiving, by the second terminal if the second terminal determines that time domain information of the feedback resource of the first data is the same as the time domain information used by the third terminal to send the second data, the feedback information of the first data after a delay of k subframes, where k is an integer greater than 0.

In this design, when the time domain information of the feedback resource used by the second terminal to receive the first data is the same as the time domain information used by the third terminal to send the second data, a feedback resource conflict can be prevented in the foregoing manner, thereby improving data feedback efficiency and improving data transmission reliability.

According to a third aspect, a device for determining a data feedback resource is provided. The device includes a receiving unit configured to receive first data sent by a peer device. The device includes a processing unit configured to determine a feedback resource of the first data. The feedback resource of the first data is a feedback resource in a feedback resource pool. The device includes a sending unit configured to send feedback information of the first data to the peer device on the feedback resource. The feedback information indicates a receiving status of the first data.

With reference to the third aspect, in a possible design, the processing unit is configured to determine, by the first terminal, time-frequency information and/or code domain information of the feedback resource of the first data. The time-frequency information includes start location information of a frequency domain resource, a length of the frequency domain resource, and indication information of a time domain resource. The code domain information includes a codeword used to send the feedback information.

With reference to the third aspect, in a possible design, the processing unit is configured to, when determining the feedback resource of the first data, obtain configuration information of the feedback resource pool and determine the feedback resource of the first data based on the configuration information of the feedback resource pool.

With reference to the third aspect, in a possible design, the processing unit is configured to, when obtaining the configuration information of the feedback resource pool, obtain the configuration information of the feedback resource pool from a network side or obtain the configuration information of the feedback resource pool using preconfigured information.

With reference to the third aspect, in a possible design, the processing unit is configured to, when obtaining the configuration information of the feedback resource pool, obtain at least one of start location information of a frequency domain resource, length information of the frequency domain resource, time-domain subframe offset information, and subframe bitmap information of the feedback resource pool.

With reference to the third aspect, in a possible design, a quantity of frequency domain resources in the feedback resource pool is determined based on a quantity of sub-channels in a data resource pool in which the first data is located.

With reference to the third aspect, in a possible design, the processing unit is configured to, when determining the feedback resource of the first data, obtain time-frequency resource information of the first data and determine the time-frequency information of the feedback resource of the first data based on the time-frequency resource information of the first data.

With reference to the third aspect, in a possible design, the time-frequency resource information that is of the first data and that is obtained by the processing unit includes information about a time-frequency resource carrying SCI of the first data and/or information about a time-frequency resource carrying service data of the first data.

With reference to the third aspect, in a possible design, the processing unit is configured to, when determining the feedback resource of the first data, determine code domain information of the feedback resource of the first data. Determining the code domain information of the feedback resource of the first data includes obtaining at least one of time-frequency resource information of the first data, ID information of the device, and ID information of the peer device, and includes determining the code domain information of the feedback resource of the first data based on the at least one obtained information.

With reference to the third aspect, in a possible design, the sending unit is configured to, when sending the feedback information of the first data to the peer device on the feedback resource, obtain time domain information used by another terminal to send second data and send, if the processing unit determines that time domain information of the feedback resource of the first data is the same as the time domain information used by the another terminal to send the second data, the feedback information of the first data after a delay of k subframes, where k is an integer greater than 0.

According to a fourth aspect, a device for determining a data feedback resource is provided. The device includes a sending unit configured to send first data to a peer device. The device further includes a processing unit configured to determine a feedback resource of the first data. The feedback resource of the first data is a feedback resource in a feedback resource pool. The device includes a receiving unit configured to receive, on the feedback resource, feedback information that is of the first data and that is sent by the peer device. The feedback information indicates a receiving status of the first data.

With reference to the fourth aspect, in a possible design, the processing unit is configured to determine time-frequency information and/or code domain information of the feedback resource of the first data. The time-frequency information includes start location information of a frequency domain resource, a length of the frequency domain resource, and indication information of a time domain resource. The code domain information includes a codeword used to send the feedback information.

With reference to the fourth aspect, in a possible design, the processing unit is configured to, when determining the feedback resource of the first data, obtain configuration information of the feedback resource pool and determine the feedback resource of the first data based on the configuration information of the feedback resource pool.

With reference to the fourth aspect, in a possible design, the processing unit is configured to, when obtaining the configuration information of the feedback resource pool, obtain the configuration information of the feedback resource pool from a network side or obtain the configuration information of the feedback resource pool using pre-configured information.

With reference to the fourth aspect, in a possible design, the processing unit is configured to, when obtaining the configuration information of the feedback resource pool, obtain at least one of start location information of a frequency domain resource, length information of the frequency domain resource, time-domain subframe offset information, and subframe bitmap information of the feedback resource pool.

With reference to the fourth aspect, in a possible design, a quantity of frequency domain resources in the feedback resource pool is determined based on a quantity of sub-channels in a data resource pool in which the first data is located.

With reference to the fourth aspect, in a possible design, the processing unit is configured to, when determining the feedback resource of the first data, obtain time-frequency resource information of the first data and determine the time-frequency information of the feedback resource of the first data based on the time-frequency resource information of the first data.

With reference to the fourth aspect, in a possible design, the time-frequency resource information that is of the first data and that is obtained by the processing unit includes information about a time-frequency resource carrying SCI of the first data and/or information about a time-frequency resource carrying service data of the first data.

With reference to the fourth aspect, in a possible design, the processing unit is configured to, when determining the feedback resource of the first data, determine code domain information of the feedback resource of the first data. Determining the code domain information of the feedback resource of the first data includes obtaining at least one of time-frequency resource information of the first data, ID information of the peer device, and ID information of the device, and includes determining the code domain information of the feedback resource of the first data based on the at least one obtained information.

With reference to the fourth aspect, in a possible design, the receiving unit is configured to, when receiving, on the feedback resource, the feedback information that is of the first data and that is sent by the peer device, obtain time domain information used by another terminal to send second data and receive, if the processing unit determines that time domain information of the feedback resource of the first data is the same as the time domain information used by the another terminal to send the second data, the feedback information of the first data after a delay of k subframes, where k is an integer greater than 0.

According to a fifth aspect, a terminal device is provided. A structure of the terminal device includes a transceiver, a memory, and a processor. The memory is configured to store a group of programs, and the processor is configured to invoke the programs stored in the memory, to perform the method performed by the first terminal in any one of the foregoing aspects.

According to a sixth aspect, a terminal device is provided. A structure of the terminal device includes a transceiver, a memory, and a processor. The memory is configured to store a group of programs, and the processor is configured to invoke the programs stored in the memory, to perform the method performed by the second terminal in any one of the foregoing aspects.

According to a seventh aspect, this application further provides a computer-readable storage medium, configured to store a computer software instruction used for performing functions of the first aspect or any design of the first aspect, where the computer software instruction includes a program designed for performing the method in the first aspect or any design of the first aspect.

According to an eighth aspect, this application further provides a computer-readable storage medium, configured to store a computer software instruction used for performing functions of the second aspect or any design of the second aspect, where the computer software instruction includes a program designed for performing the method in the second aspect or any design of the second aspect.

DETAILED DESCRIPTION OF ILLUSTRATIVE EMBODIMENTS

Embodiments of this application may be applied to device to device (D2D) communication and V2X communication, which does not constitute a limitation. A terminal in embodiments of this application may also be referred to as user equipment (UE), a mobile station (MS), a mobile terminal, or the like. Optionally, the terminal may be a vehicle, a mobile phone, a tablet computer, a personal digital assistant (PDA), a point of sale (POS), an in-vehicle computer, a set top box, or the like.

In embodiments of this application, the V2X communication may include but is not limited to vehicle-to-vehicle (V2V) communication, vehicle-to-infrastructure (V2I) communication, vehicle-to-pedestrian (V2P) communication, and vehicle-to-network (V2N) communication. The V2I communication may include but is not limited to communication between a vehicle and a base station, communication between a vehicle and a roadside unit, and communication between a vehicle and a communications module on a traffic light.

Figure 1A:
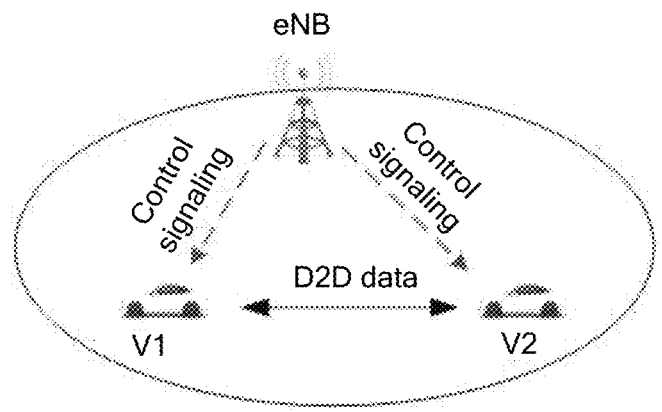
FIG. 1A and FIG. 1B are schematic diagrams of communication between a vehicle and another node according to an embodiment of this application.
Figure 1B:
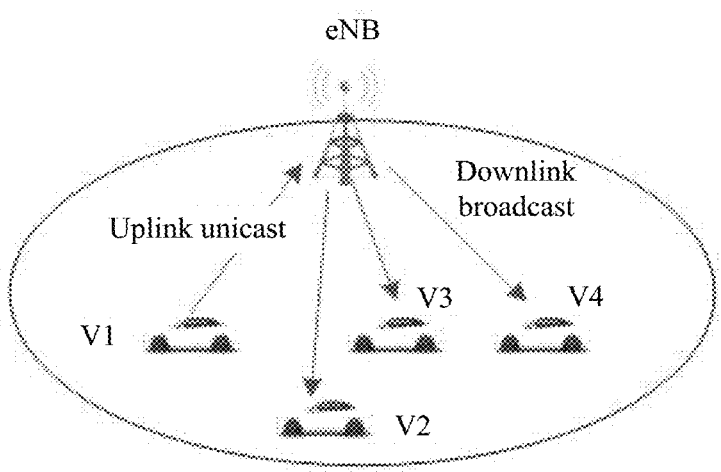

In a V2X system, a vehicle usually communicates with another node in two manners. In a first manner, as shown in FIG. 1A, a vehicle sends state information of the vehicle to another nearby vehicle in a broadcast manner, and in this case, a base station does not need to forward data. This communication manner is similar to that in a D2D system. In a second manner, as shown in FIG. 1B, data of a vehicle is forwarded using a base station, and in this case, the vehicle first sends the data to the base station, and then the base station sends the received data to another vehicle or node in a unicast or broadcast manner.

In FIG. 1A, a terminal sends data in a D2D broadcast manner, and may send data in a mode 1 or a mode 2. In the mode 1, a base station allocates a determined transmission resource to the terminal. In the mode 2, the terminal voluntarily selects a resource from a resource pool configured by the base station or a preconfigured resource pool, to perform data transmission.

The D2D communication is direct data communication between two terminals and is implemented using a mechanism of a scheduling assignment (SA) part plus a data (Data) part. The SA is usually referred to as sidelink control information (SCI), and indicates control information of data sent from a transmit end, for example, time-frequency resource information of the data, modulation and coding scheme (MCS) information, a frequency hopping indication, timing advance information, receiving group ID information, data priority information, resource reservation information, and retransmission indication information. The data is service data that is sent by the transmit end at a time-frequency resource location indicated by the SA and in a format indicated by the SA, so that a receive end can receive the data according to the indication of the SA.

In embodiments of this application, after receiving first data sent by a second terminal, a first terminal can send feedback information of the first data to the second terminal on a determined feedback resource of the first data. Therefore, the second terminal serving as a transmit end can determine, by detecting the feedback information, whether the sent first data is successfully received, thereby improving data transmission reliability.

With reference to the accompanying drawings, the following describes in detail a solution for determining a data feedback resource provided in this application.

Figure 2:
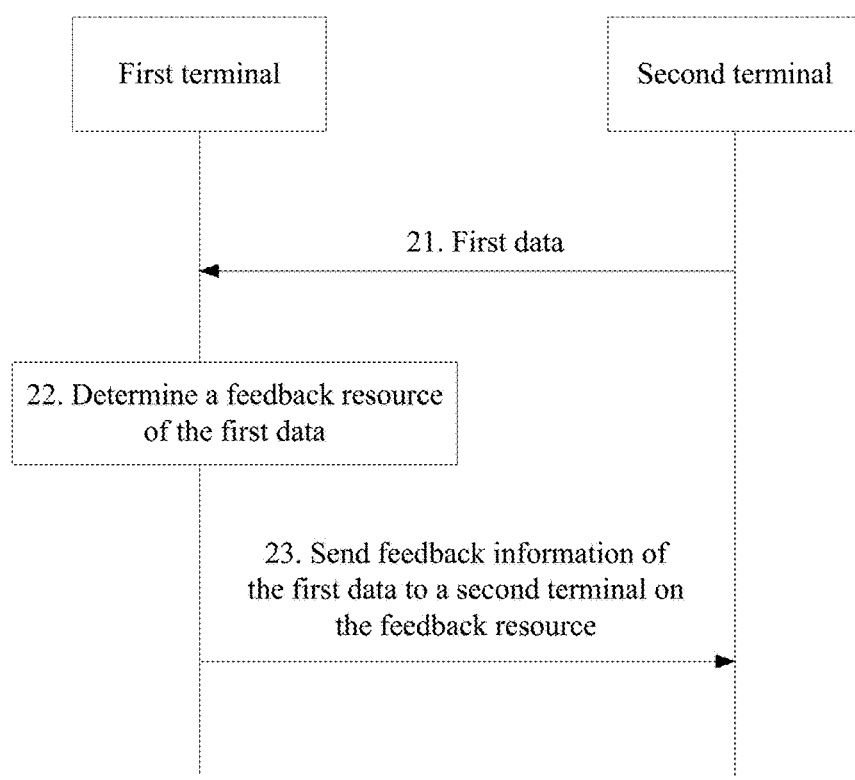
FIG. 2 is a flowchart of a method for determining a data feedback resource according to an embodiment of this application.

As shown in FIG. 2, a method for determining a data feedback resource according to an embodiment of this application includes the following specific procedure:

Step 21: A first terminal receives first data sent by a second terminal.

Step 22: The first terminal determines a feedback resource of the first data.

The feedback resource of the first data is a feedback resource in a feedback resource pool. The feedback resource pool is a set of time-frequency resources, the feedback resource pool includes at least one resource used to transmit feedback information, and a quantity of frequency domain resources in the feedback resource pool is determined based on a quantity of sub-channels in a data resource pool in which the first data is located.

Determining, by the first terminal, a feedback resource of the first data includes determining, by the first terminal, time-frequency information and/or code domain information of the feedback resource of the first data. The time-frequency information includes start location information of a frequency domain resource, a length of the frequency domain resource, and indication information of a time domain resource. The code domain information includes a codeword used to send the feedback information.

Specifically, the first terminal may determine the feedback resource of the first data in a manner that is not limited to the following two implementations. Further, the first terminal may determine the feedback resource of the first data by combining the following two implementations.

In a first implementation, the first terminal obtains configuration information of the feedback resource pool and determines the feedback resource of the first data based on the configuration information of the feedback resource pool.

It should be noted that the first terminal may obtain the configuration information of the feedback resource pool in the following two cases.

In a first case, the first terminal obtains the configuration information of the feedback resource pool from a network side. For example, the first terminal may obtain the configuration information of the feedback resource pool from a network side device such as a base station or a central controller on the network side.

In a second case, the first terminal obtains the configuration information of the feedback resource pool using preconfigured information. In this case, the terminal obtains the configuration information of the feedback resource pool from preconfigured information of the terminal.

Obtaining, by the first terminal configuration information of the feedback resource pool includes obtaining, by the first terminal, at least one of start location information of a frequency domain resource, length information of the frequency domain resource, time-domain subframe offset information, and subframe bitmap information of the feedback resource pool.

In a second implementation, the first terminal obtains time-frequency resource information of the first data and determines the time-frequency information of the feedback resource of the first data based on the time-frequency resource information of the first data.

Figure 3A:
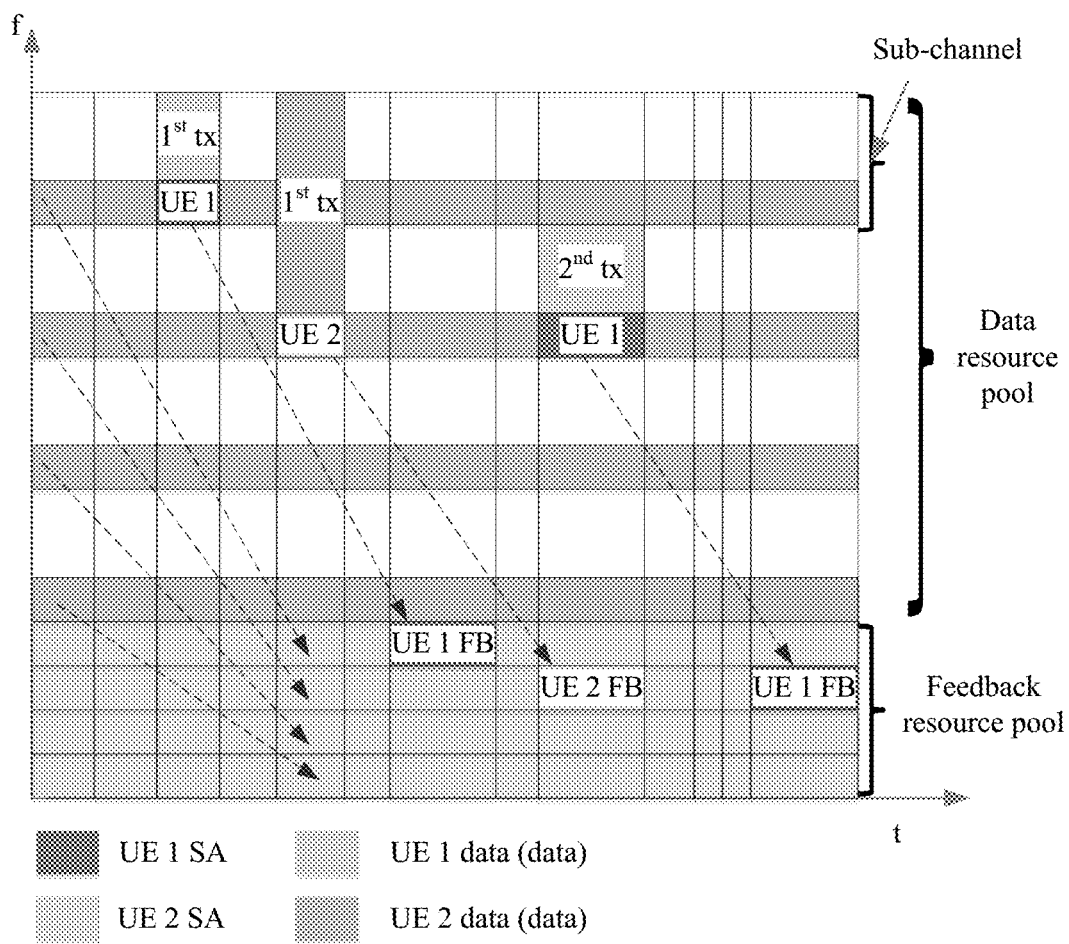
FIG. 3A and FIG. 3B are schematic diagrams of a feedback resource according to an embodiment of this application.
Figure 3B:
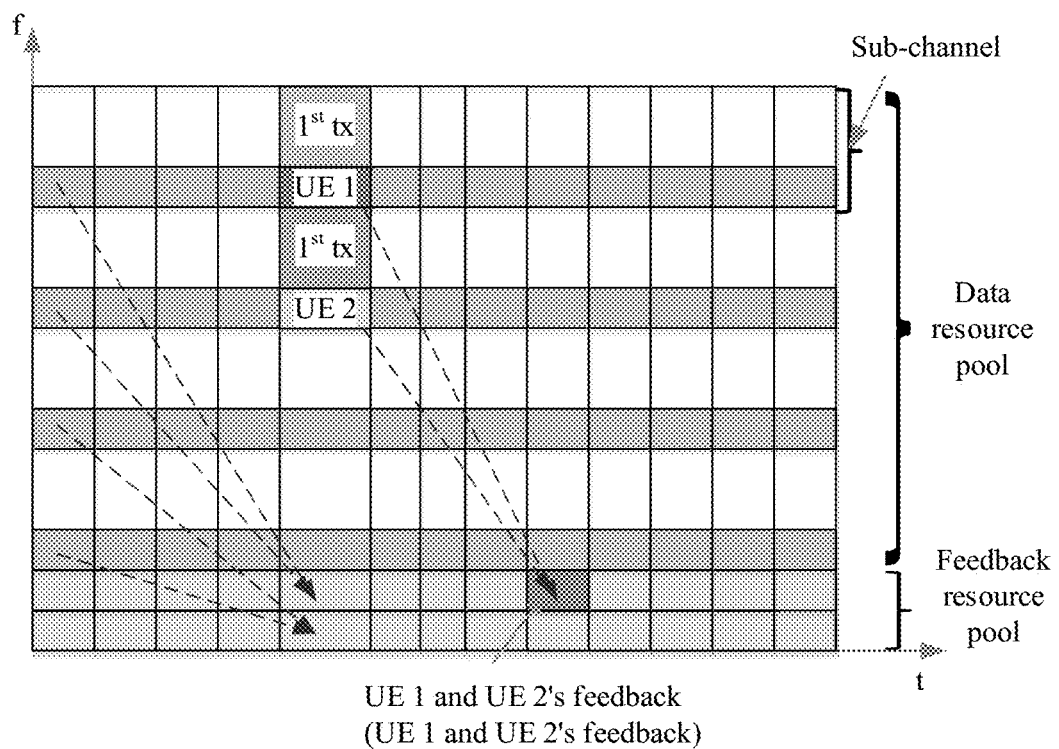

In the second implementation, a time-frequency location of the feedback resource is determined based on a corresponding time-frequency location of the received first data. Specifically, the received first data includes two parts: SA and service data. The time-frequency location of the feedback resource is determined based on a corresponding time-frequency resource carrying SCI of the first data, or based on a corresponding time-frequency resource carrying the service data of the received first data. Specifically, FIG. 3A and FIG. 3B are schematic diagrams of a correspondence between a feedback resource and a time-frequency resource of first data.

It should be noted that the time-frequency resource information of the first data that is obtained by the first terminal includes information about the time-frequency resource carrying the SCI of the first data and/or information about the time-frequency resource carrying the service data of the first data.

In this implementation, there is a correspondence between a feedback resource and a time-frequency resource of first data corresponding to the feedback resource. In other words, the time-frequency location of the feedback resource may be determined based on the time-frequency location of the first data. An example of a possible implementation is as follows:

It is assumed that an index of a sub-channel in one subframe is m (m=0, 1, 2, . . . , or M−1), M is a total quantity of sub-channels in the subframe, an index of a feedback resource is n (n=0, 1, 2, . . . , or N−1), and N is a total quantity of feedback resources in the subframe.

Specifically, in a process of determining a frequency domain resource, if M=N, each sub-channel corresponds to one feedback resource, that is, n=m; or if M=2N, every two sub-channels correspond to one feedback resource, that is, n=[m/2], where [m/2] indicates that m/2 is rounded down.

By analogy, if M=k×N, where k indicates an integer greater than or equal to 1, every k sub-channels correspond to one feedback resource, that is, n=[m/k].

Specifically, in a process of determining a time domain resource, if a user receives the first data in a subframe t, the user sends the feedback information in a subframe (t+a), where a is a preset integer greater than 0, and optionally, a≥4.

It is worth noting that, in this application, a plurality of feedback channels may be multiplexed on one feedback resource in a code division manner. Therefore, when determining the feedback resource of the first data, the first terminal further determines the code domain information of the feedback resource of the first data, and a specific process is as follows:

The first terminal obtains at least one of time-frequency resource information of the first data, ID information of the first terminal, and ID information of the second terminal, and the first terminal determines the code domain information of the feedback resource of the first data based on the at least one obtained information.

When a plurality of feedback channels may be multiplexed on one feedback resource in a code division manner, an example of a possible implementation is as follows:

Assuming that a total quantity of code division resources on one feedback resource is P, and P is a positive integer greater than 0, a feedback resource p (p=0, 1, . . . , or P−1) of a specific user may be determined using the following expression:

$$p=f(Res_{data}, UE\ ID_{tx}, UE\ ID_{rx}), where$$

p=f(x,y,z) indicates that p is a function of input variables x, y, and z, $Res_{data}$ indicates a time-frequency location of a data resource, UE $ID_{tx}$ indicates an ID of a data transmit end, and UE $ID_{rx}$ indicates an ID of a data receive end.

Further, the feedback resource p may be alternatively determined using the following expression:

$$p=mod(UE\ ID_{rx}, P), where$$

mod( ) indicates a modulo operation.

Alternatively, the feedback resource p may be determined using the following expression:

$$p=mod(UE\ ID_{tx}, P).$$

Alternatively, the feedback resource p may be determined using the following expression:

$$p=mod(m,P), where$$

m (m=0, 1, 2, . . . , or M−1) indicates an index of a lowest frequency-domain sub-channel occupied by the received first data.

Step 23: The first terminal sends feedback information of the first data to the second terminal on the feedback resource. The feedback information indicates a receiving status of the first data.

Specifically, if the first terminal successfully receives the first data, the first terminal sends an acknowledgement (ACK) message to the second terminal. If the first terminal receives no data, the first terminal does not send the feedback information to the second terminal.

Alternatively, the first terminal sends the feedback information of the first data to the second terminal on the feedback resource. The feedback information describes channel quality of a transmission channel of the first data.

Further, when sending the feedback information of the first data to the second terminal on the feedback resource, the first terminal obtains time domain information used by a third terminal to send second data. If the first terminal determines that time domain information of the feedback resource of the first data is the same as the time domain information used by the third terminal to send the second data, the first terminal sends the feedback information of the first data after a delay of k subframes, where k is an integer greater than 0.

Specifically, the second data sent by the third terminal may be service data or may be feedback information.

For example, when a terminal A sends feedback information to a terminal B, the terminal A obtains time domain information used by a terminal C to send data, where the terminal C is, for example, a first vehicle in a vehicle queue. If a subframe in which the terminal A sends a feedback resource is the same as a subframe in which the terminal C sends the data, the terminal A sends the feedback information after a delay of k subframes (k is an integer greater than 0).

According to a method for determining a data feedback resource in an internet-of-vehicles, after receiving the first data, the first terminal serving as a receive end determines the feedback resource of the first data and sends, on the determined feedback resource, the feedback information of the first data to the second terminal serving as a transmit end. Therefore, the second terminal serving as the transmit end can determine whether the sent first data is successfully received, thereby improving data transmission reliability.

Figure 4:
FIG. 4 is a schematic diagram of a vehicle queue driving scenario according to an embodiment of this application.

The method for determining a data feedback resource in an internet-of-vehicles may be applied to a process of selecting a resource for the first vehicle in a vehicle queue driving scenario in FIG. 4.

In the vehicle queue driving scenario, the first vehicle periodically broadcasts information about the first vehicle, such as a location, a direction, and a speed, and a receive end does not need to send a feedback for the information. In addition, the first vehicle is responsible for managing an entire vehicle queue, for example, controlling a speed of a vehicle queue, a vehicle distance, joining of another vehicle in the vehicle queue, and leaving of a vehicle from the vehicle queue. Therefore, the first vehicle communicates with other members in the vehicle queue in a unicast or broadcast manner, and requires feedbacks of the members in the vehicle queue.

The first vehicle sends, in two manners, information to be fed back.

A first manner is periodic sending. For example, the first vehicle periodically sends vehicle distance information, vehicle speed information, and acceleration and deceleration information. For the periodically sent information, a monitoring process, a selection process, and the like in the existing V2X may be used, and details are not described herein.

A second manner is event-triggered sending. For example, when the first vehicle receives a joining request of another vehicle that is not in the vehicle queue, the first vehicle needs to respond to the request. Alternatively, when the first vehicle receives a leaving request of a vehicle in the vehicle queue, the first vehicle needs to respond to the request.

There may be the following manners for an event-triggered sent message:

In a possible implementation, when a terminal sends data information to be fed back, resource reselection is triggered, and the terminal selects an available resource for data sending.

In another possible implementation, a resource is reserved for transmitting data information to be fed back. Specifically, the network side preconfigures resources for transmitting data information to be fed back and sends configuration information of the preconfigured resources to the terminal. The terminal receives the configuration information, obtains the preconfigured resources based on the configuration information, and selects a resource from the preconfigured resources to transmit the data information.

The method for determining a data feedback resource in an internet-of-vehicles may be further applied to a process of selecting a resource for another vehicle other than the first vehicle in a vehicle queue driving scenario.

In the vehicle queue driving scenario, when another vehicle other than the first vehicle in a vehicle queue reselects a resource, a resource used by the first vehicle is considered, and a subframe used by the first vehicle is avoided for selection of a resource by the another vehicle, thereby avoiding a problem that information about the first vehicle cannot be received due to a half-duplex problem.

When the terminal selects a resource, resources to be excluded in a resource selection window include:

1. a resource reserved by the first vehicle in the selection window; and 2. a resource that is preconfigured in the selection window or configured by the base station and that may be used by the first vehicle to transmit data.

In a process in which the terminal selects a resource, a subframe that may be used by the first vehicle is excluded, thereby avoiding a case in which the terminal cannot receive data of the first vehicle because the terminal and the first vehicle transmit data in a same subframe.

In embodiments of this application, functional units of the terminal may be divided based on the foregoing method example. For example, the terminal may be divided into functional units based on corresponding functions, or two or more functions may be integrated into one processing unit. The integrated unit may be implemented in a form of hardware, or may be implemented in a form of a software function unit. It should be noted that, in embodiments of this application, the unit division is an example, and is merely logical function division. During actual implementation, there may be another division manner.

Figure 5:
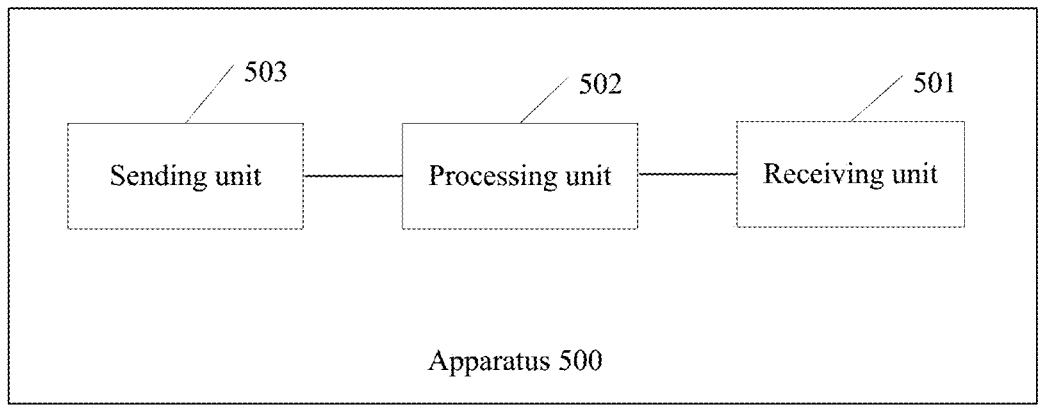
FIG. 5 is a schematic structural diagram of an apparatus for determining a data feedback resource according to an embodiment of this application.

When an integrated unit is used, FIG. 5 is a schematic structural diagram of an apparatus for determining a data feedback resource according to an embodiment of this application. Referring to FIG. 5, the apparatus 500 includes a receiving unit 501, a processing unit 502, and a sending unit 503.

The receiving unit 501 is configured to receive first data sent by a peer device.

The processing unit 502 is configured to determine a feedback resource of the first data. The feedback resource of the first data is a feedback resource in a feedback resource pool.

The sending unit 503 is configured to send feedback information of the first data to the peer device on the feedback resource. The feedback information indicates a receiving status of the first data.

Optionally, the processing unit 502 is configured to determine, by the first terminal, time-frequency information and/or code domain information of the feedback resource of the first data. The time-frequency information includes start location information of a frequency domain resource, a length of the frequency domain resource, and indication information of a time domain resource. The code domain information includes a codeword used to send the feedback information.

Optionally, the processing unit 502 is configured to, when determining the feedback resource of the first data, obtain configuration information of the feedback resource pool and determine the feedback resource of the first data based on the configuration information of the feedback resource pool.

Optionally, the processing unit 502 is configured to, when obtaining the configuration information of the feedback resource pool, obtain the configuration information of the feedback resource pool from a network side or obtain the configuration information of the feedback resource pool using preconfigured information.

Optionally, the processing unit 502 is configured to, when obtaining the configuration information of the feedback resource pool, obtain at least one of start location information of a frequency domain resource, length information of the frequency domain resource, time-domain subframe offset information, and subframe bitmap information of the feedback resource pool.

Optionally, a quantity of frequency domain resources in the feedback resource pool is determined based on a quantity of sub-channels in a data resource pool in which the first data is located.

Optionally, the processing unit 502 is configured to, when determining the feedback resource of the first data, obtain time-frequency resource information of the first data and determine the time-frequency information of the feedback resource of the first data based on the time-frequency resource information of the first data.

Optionally, the time-frequency resource information that is of the first data and that is obtained by the processing unit 502 includes information about a time-frequency resource carrying SCI of the first data and/or information about a time-frequency resource carrying service data of the first data.

Optionally, the processing unit 502 is configured to, when determining the feedback resource of the first data, determine code domain information of the feedback resource of the first data. Determining the code domain information of the feedback resource of the first data includes obtaining at least one of time-frequency resource information of the first data, ID information of the apparatus 500, and ID information of the peer device, and includes determining the code domain information of the feedback resource of the first data based on the at least one obtained information.

Optionally, the sending unit 503 is configured to, when sending the feedback information of the first data to the peer device on the feedback resource, obtain time domain information used by another terminal to send second data and send, if the processing unit 502 determines that time domain information of the feedback resource of the first data is the same as the time domain information used by the another terminal to send the second data, the feedback information of the first data after a delay of k subframes, where k is an integer greater than 0.

Figure 6:
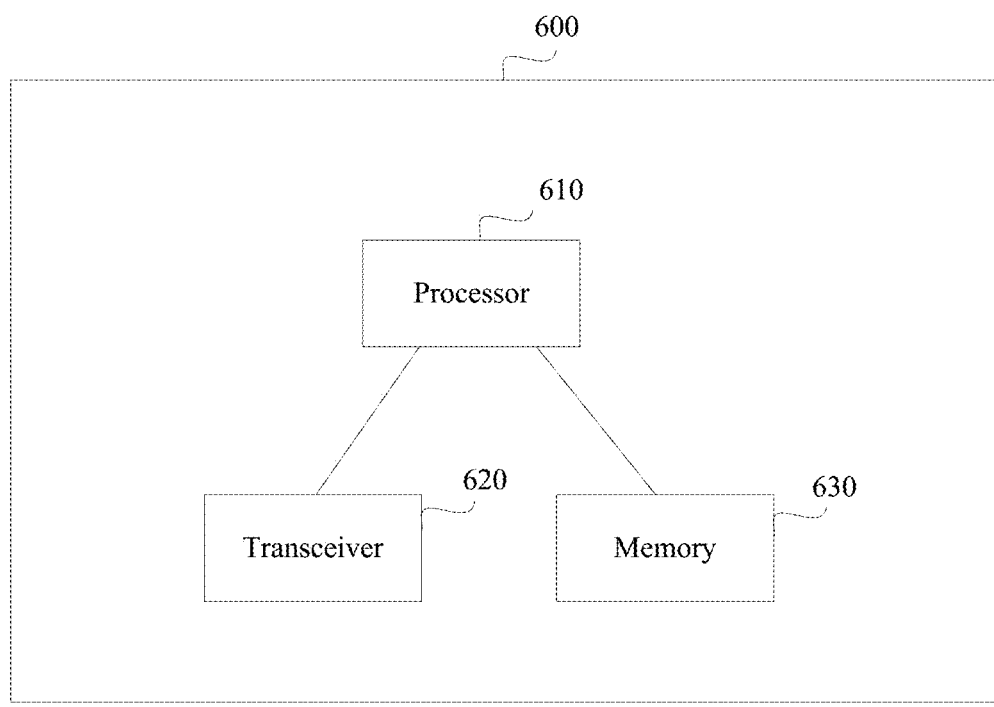
FIG. 6 is a schematic structural diagram of a device for determining a data feedback resource according to an embodiment of this application.

It should be noted that, in this embodiment of this application, the processing unit 502 may be implemented as a processor, the receiving unit 501 may be implemented as a receiver, the sending unit 503 may be implemented as a transmitter, and the receiver and the transmitter may be combined into a transceiver for implementation. As shown in FIG. 6, a device 600 for determining a data feedback resource may include a processor 610, a transceiver 620, and a memory 630. The memory 630 may be configured to store a program/code preinstalled when the device 600 is delivered from a factory, and may further store code and the like used for execution of the processor 610.

The processor 610 may be configured to perform a related operation using a general-purpose CPU, a microprocessor, an ASIC, or one or more integrated circuits, to implement the technical solutions provided in embodiments of the present disclosure.

It should be noted that, although the device 600 shown in FIG. 6 merely shows the processor 610, the transceiver 620, and the memory 630, in a specific implementation process, a person skilled in the art should understand that the device 600 further includes another component needed for implementing normal running. In addition, a person skilled in the art should understand that, according to specific requirements, the device 600 may further include a hardware component for implementing another additional function. In addition, a person skilled in the art should understand that the device may include only components or modules that are necessary for implementing embodiments of the present disclosure, and does not need to include all components shown in FIG. 6.

Figure 7:
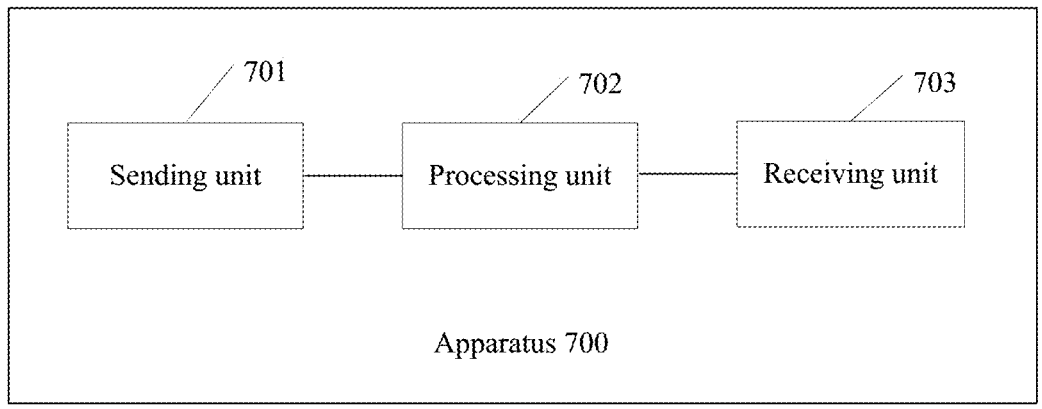
FIG. 7 is a schematic structural diagram of an apparatus for determining a data feedback resource according to an embodiment of this application.

FIG. 7 is a schematic structural diagram of an apparatus for determining a data feedback resource according to an embodiment of this application. Referring to FIG. 7, the apparatus 700 includes a sending unit 701, a processing unit 702, and a receiving unit 703.

The sending unit 701 is configured to send first data to a peer device.

The processing unit 702 is configured to determine a feedback resource of the first data. The feedback resource of the first data is a feedback resource in a feedback resource pool.

The receiving unit 703 is configured to receive, on the feedback resource, feedback information that is of the first data and that is sent by the peer device. The feedback information indicates a receiving status of the first data.

Optionally, the processing unit 702 is configured to determine time-frequency information and/or code domain information of the feedback resource of the first data. The time-frequency information includes start location information of a frequency domain resource, a length of the frequency domain resource, and indication information of a time domain resource. The code domain information includes a codeword used to send the feedback information.

Optionally, the processing unit 702 is configured to, when determining the feedback resource of the first data, obtain configuration information of the feedback resource pool and determine the feedback resource of the first data based on the configuration information of the feedback resource pool.

Optionally, the processing unit 702 is configured to, when obtaining the configuration information of the feedback resource pool, obtain the configuration information of the feedback resource pool from a network side or obtain the configuration information of the feedback resource pool using preconfigured information.

Optionally, the processing unit 702 is configured to, when obtaining the configuration information of the feedback resource pool, obtain at least one of start location information of a frequency domain resource, length information of the frequency domain resource, time-domain subframe offset information, and subframe bitmap information of the feedback resource pool.

Optionally, a quantity of frequency domain resources in the feedback resource pool is determined based on a quantity of sub-channels in a data resource pool in which the first data is located.

Optionally, the processing unit 702 is configured to, when determining the feedback resource of the first data, obtain time-frequency resource information of the first data and determine the time-frequency information of the feedback resource of the first data based on the time-frequency resource information of the first data.

Optionally, the time-frequency resource information that is of the first data and that is obtained by the processing unit 702 includes information about a time-frequency resource carrying SCI of the first data and/or information about a time-frequency resource carrying service data of the first data.

Optionally, the processing unit 702 is configured to, when determining the feedback resource of the first data, determine the code domain information of the feedback resource of the first data. Determining the code domain information of the feedback resource of the first data includes obtaining at least one of time-frequency resource information of the first data, ID information of the peer device, and ID information of the device, and includes determining the code domain information of the feedback resource of the first data based on the at least one obtained information.

Optionally, the receiving unit 703 is configured to, when receiving, on the feedback resource, the feedback information that is of the first data and that is sent by the peer device, obtain time domain information used by another terminal to send second data, and to receive, if the processing unit 702 determines that time domain information of the feedback resource of the first data is the same as the time domain information used by the another terminal to send the second data, the feedback information of the first data after a delay of k subframes, where k is an integer greater than 0.

Figure 8:
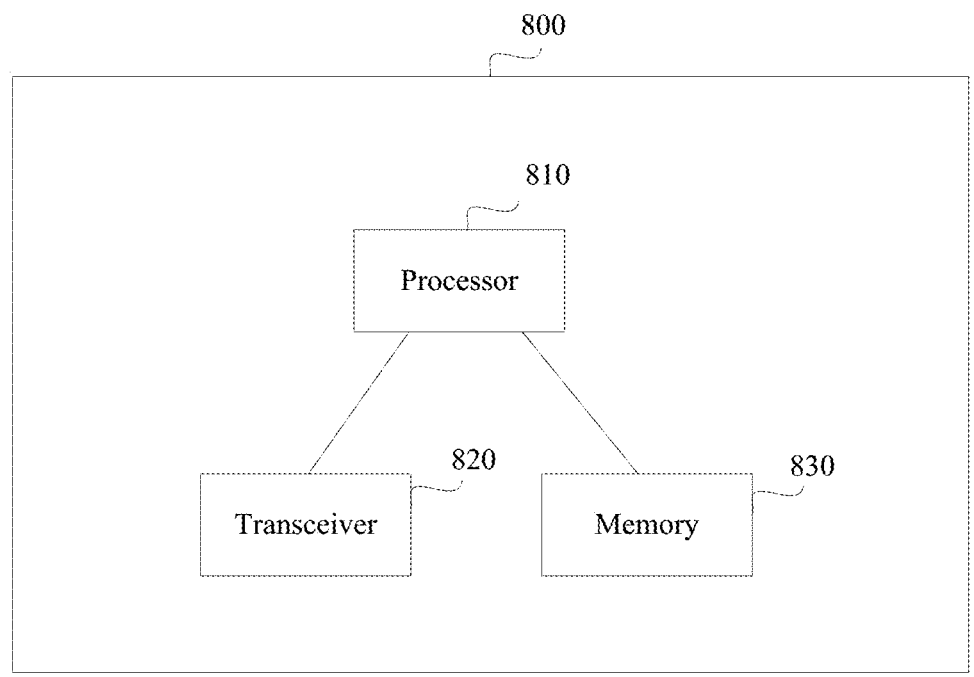
FIG. 8 is a schematic structural diagram of a device for determining a data feedback resource according to an embodiment of this application.

It should be noted that, in this embodiment of this application, the processing unit 702 may be implemented as a processor, the receiving unit 703 may be implemented as a receiver, the sending unit 701 may be implemented as a transmitter, and the receiver and the transmitter may be combined into a transceiver for implementation. As shown in FIG. 8, a device 800 for determining a data feedback resource may include a processor 810, a transceiver 820, and a memory 830. The memory 830 may be configured to store a program/code preinstalled when the device 800 is delivered from a factory, and may further store code and the like used for execution of the processor 810.

The processor 810 may be configured to perform a related operation using a general-purpose CPU, a microprocessor, an ASIC, or one or more integrated circuits, to implement the technical solutions provided in embodiments of the present disclosure.

It should be noted that, although the device 800 shown in FIG. 8 merely shows the processor 810, the transceiver 820, and the memory 830, in a specific implementation process, a person skilled in the art should understand that the device 800 further includes another component needed for implementing normal running. In addition, a person skilled in the art should understand that, according to specific requirements, the device 800 may further include a hardware component for implementing another additional function. In addition, a person skilled in the art should understand that the device may include only components or modules that are necessary for implementing embodiments of the present disclosure, and does not need to include all components shown in FIG. 8.

An embodiment of this application further provides a computer-readable storage medium, configured to store a computer software instruction used to perform operations that need to be performed by the processor. The computer software instruction includes a program used to perform the operations that need to be performed by the processor.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a magnetic disk storage, a CD-ROM, and an optical memory) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims of this application and their equivalent technologies.

The invention claimed is:

1. A method, comprising:
receiving first data from a second terminal;
determining, according to a resource on which the first data is sent from the second terminal to a first terminal, start location information of a frequency domain resource of a feedback resource to be used for transmitting feedback information of the first data to the second terminal, a length of the frequency domain resource of the feedback resource to be used for transmitting the feedback information, and a time domain resource of the feedback resource to be used for transmitting the feedback information, the feedback information indicating a receiving status of the first data; and
sending the feedback information of the first data to the second terminal on the feedback resource.

2. The method according to claim 1, wherein the method further comprises:
obtaining according to time-frequency resource information of sidelink control information (SCI) of the first data, the resource on which the first data is sent.

3. The method according to claim 1, wherein the method further comprises:
determining according to the resource on which the first data is sent and ID information of the second terminal, code domain information of the feedback resource used for transmitting the feedback information of the first data, the code domain information comprising a code word used to send the feedback information.

4. The method according to claim 1, wherein the feedback resource used for transmitting the feedback information of the first data is a feedback resource in a feedback resource pool.

5. The method according to claim 4, wherein the method further comprises:
obtaining configuration information of the feedback resource pool; and
determining the feedback resource based on the configuration information of the feedback resource pool.

6. The method according to claim 5, wherein obtaining the configuration information of the feedback resource pool comprises:
obtaining the configuration information of the feedback resource pool from a base station; or
obtaining the configuration information of the feedback resource pool using preconfigured information.

7. A method, comprising:
sending first data to a first terminal;
determining, according to a resource on which the first data is sent from a second terminal to the first terminal, start location information of a frequency domain resource of a feedback resource to be used for receiving feedback information of the first data from the first terminal, a length of the frequency domain resource of the feedback resource to be used for receiving the feedback information, and a time domain resource of the feedback resource to be used for receiving the feedback information, the feedback information indicating a receiving status of the first data; and receiving, on the feedback resource, the feedback information of the first data from the first terminal.

8. The method according to claim 7, wherein the method further comprises:

sending sidelink control information (SCI) of the first data, wherein time-frequency resource information of the SCI of the first data is for obtaining information of the resource on which the first data is sent.

9. The method according to claim 7, wherein the method further comprises:

determining, according to the resource on which the first data is sent and ID information of the second terminal, code domain information of the feedback resource of the first data, the code domain information comprising a code word used to send the feedback information.

10. The method according to claim 7, wherein the feedback resource to be used for receiving the feedback information is a feedback resource in a feedback resource pool.

11. The method according to claim 10, wherein the method further comprises:

obtaining configuration information of the feedback resource pool; and determining the feedback resource based on the configuration information of the feedback resource pool.

12. The method according to claim 11, wherein obtaining the configuration information of the feedback resource pool comprises:

obtaining the configuration information of the feedback resource pool from a base station; or obtaining the configuration information of the feedback resource pool using preconfigured information.

13. A communication apparatus, comprising:

one or more processors; and at least one memory, wherein the at least one memory stores instructions, and when executing the instructions stored in the memory, the one or more processors executes operations comprising:

receiving first data from a second terminal;

determining, according to a resource on which the first data is sent from the second terminal to a first terminal, start location information of a frequency domain resource of a feedback resource to be used for transmitting feedback information of the first data to the second terminal, a length of the frequency domain resource of the feedback resource to be used for transmitting the feedback information, and a time domain resource of the feedback resource to be used for transmitting the feedback information, the feedback information indicating a receiving status of the first data; and sending the feedback information of the first data to the second terminal device on the feedback resource.

14. The communication apparatus according to claim 13, the operations further comprising:

obtaining, according to time-frequency resource information of sidelink control information (SCI) of the first data, the resource on which the first data is sent.

15. The communication apparatus according to claim 13, the operations further comprising:

determining, according to the resource on which the first data is sent and ID information of the second terminal, code domain information for transmitting the feedback information of the feedback resource of the first data, the code domain information comprising a code word used to send the feedback information.

16. The communication apparatus according to claim 13, wherein the feedback resource used for transmitting the feedback information of the first data is a feedback resource in a feedback resource pool.

17. The communication apparatus according to claim 16, the operations further comprising:

obtaining configuration information of the feedback resource pool; and determining the feedback resource based on the configuration information of the feedback resource pool.

18. The communication apparatus according to claim 17, wherein obtaining the configuration information of the feedback resource pool comprises:

obtaining the configuration information of the feedback resource pool from a base station; or obtaining the configuration information of the feedback resource pool using preconfigured information.

19. A communication apparatus, comprising:

one or more processors; and at least one memory, wherein the at least one memory stores instructions, and when executing the instructions stored in the memory, the one or more processors executes operations comprising:

sending first data to a first terminal;

determining, according to a resource on which the first data is sent from a second terminal to the first terminal, start location information of a frequency domain resource of a feedback resource to be used for receiving feedback information of the first data from the first terminal device, a length of the frequency domain resource of the feedback resource to be used for receiving the feedback information, and a time domain resource of the feedback resource to be used for receiving the feedback information, the feedback information indicating a receiving status of the first data; and receiving, on the feedback resource from the first terminal, the feedback information on which the first data is sent.

20. The communication apparatus according to claim 19, the operations further comprising:

sending sidelink control information (SCI) of the first data, and time-frequency resource information of the SCI of the first data is for obtaining information of the resource of the first data.

21. The communication apparatus according to claim 19, the operations further comprising:

determining, according to the resource on which the first data is sent and ID information of the second terminal, code domain information of the feedback resource, the code domain information comprising a code word used to send the feedback information.

22. The communication apparatus according to claim 19, wherein the feedback resource used for receiving the feedback information is a feedback resource in a feedback resource pool.

23. The communication apparatus according to claim 22, the operations further comprising:

obtaining configuration information of the feedback resource pool; and determining the feedback resource based on the configuration information of the feedback resource pool.

24. The communication apparatus according to claim 23, wherein obtaining the configuration information of the feedback resource pool comprises:

obtaining the configuration information of the feedback resource pool from a base station; or obtaining the configuration information of the feedback resource pool using preconfigured information.

25. A non-transitory computer-readable media storing computer instructions that when executed by one or more processors, cause a first terminal to perform:

receiving first data from a second terminal;

determining, according to a resource on which the first data is sent from the second terminal to the first terminal, start location information of a frequency domain resource of a feedback resource to be used for transmitting feedback information of the first data to the second terminal, a length of the frequency domain resource of the feedback resource to be used for transmitting the feedback information, and a time domain resource of the feedback resource to be used for transmitting the feedback information, the feedback information indicating a receiving status of the first data; and sending the feedback information of the first data to the second terminal on the feedback resource.

26. A non-transitory computer-readable media storing computer instructions that when executed by one or more processors, cause a second terminal to perform the steps of:

sending first data to a first terminal;

determining, according to a resource on which the first data is sent to the first terminal from the second terminal, start location information of a frequency domain resource of a feedback resource to be used for receiving feedback information of the first data from the first terminal, a length of the frequency domain resource of the feedback resource to be used for receiving the feedback information, and a time domain resource of the feedback resource to be used for receiving the feedback information, the feedback information indicating a receiving status of the first data; and receiving, on the feedback resource, the feedback information of the first data from the first terminal.

* * * * *

UNITED STATES PATENT AND TRADEMARK OFFICE
CERTIFICATE OF CORRECTION

PATENT NO. : 11,937,216 B2
APPLICATION NO. : 17/715620
DATED : March 19, 2024
INVENTOR(S) : Zhao It is certified that error appears in the above-identified patent and that said Letters Patent is hereby corrected as shown below:

In the Claims

Column 19, Claim 13, Line 56; delete "device".

Column 20, Claim 19, Line 33; delete "device".

Signed and Sealed this
Thirtieth Day of April, 2024

Katherine Kelly Vidal
*Director of the United States Patent and Trademark Office*